United States Patent Office 3,409,567
Patented Nov. 5, 1968

3,409,567
CLOSURES FOR CONTAINERS
Raymond Dinsdale and Kenneth John Day, London, England, assignors to W. R. Grace & Co., Cambridge, Mass., a corporation of Connecticut
No Drawing. Filed Nov. 20, 1964, Ser. No. 412,844
Claims priority, application Great Britain, Nov. 25, 1963, 46,503/63
10 Claims. (Cl. 260—5)

ABSTRACT OF THE DISCLOSURE

A vulcanizable composition for forming gaskets in closure elements for containers comprised of a rubber latex, a vulcanizing agent for the rubber, an ammonium soap, zinc oxide, a non-ionic surfactant which is a condensation product of an alkylene oxide and a member selected from a long chain fatty alcohol, acid and amine, and a filler. The compositions may include an anti-oxidant, a pigment and a blowing agent.

This invention relates to covers and stoppers for containers, e.g. jars, bottles, drums, and the like. In what follows, covers and stoppers will be deemed both to be included under the generic term "closures."

The closures with which the invention is concerned are generally of metal or a plastic, and are provided with a layer (normally an annular layer or "gasket") which when pressed or held against the rim of the container makes a firm seal between the rim and the closure. Different methods of providing such sealing layers are available. One type, with which the invention is particularly concerned, is to form the layer on the closure base from a latex compound of natural rubber or a synthetic elastomer, and then to dry the latex compound and in some cases effect a degree of cure by heating. The latex must, of course, be stable on storage, i.e. it must not gel prematurely, and it must have suitable rheological properties to enable it to retain its form between its application to the closure and drying. Thus, it has in the past been usual to include in the latex a suitable stabilizer and a thickening agent, as well as a vulcanizing system giving a degree of cure which affords a slightly or moderately compressible product. The hardness of the product can also be modified by including a softening agent, e.g. a paraffin wax, in the latex compound.

While very satisfactory sealing layers or gaskets can be obtained in this way, the prior processes have the disadvantage that, while the latex compounds employed have had a practically useful storage stability, the drying operation has necessitated heating for a considerable time, normally 2–3 hours.

It is an object of the present invention to provide a process in which this disadvantage is overcome without unduly impairing the storage stability, including both "chemical stability" (i.e. stability against premature gelling or standing) and also stability against gelling caused by shaking or other forms of agitation ("mechanical stability").

According to the invention, sealing layers are made by applying to a closure base or to the rim of a container a latex to which has been added an ammonium soap, zinc, either as zinc oxide (which will form zinc-ammonium ions in the latex) or as a zinc-ammonium soap or other salt, and a non-ionic surfactant. Preferably also the latex compound contains a mixture of two or more fillers to give it the necessary viscosity, and also a softening agent. The latex compound will normally also contain conventional additives, such as an anti-oxidant, a sulphur or other vulcanizing system, a bactericide, a coloring material, etc.

As the rubber component of the latex compound it is preferred to use a mixture of natural rubber with a smaller proportion, e.g. up to 25% or 30%, of a synthetic elastomer, e.g. a styrene-butadiene or nitrile rubber. If desired, however, it may comprise wholly or mainly a synthetic rubber, or wholly natural rubber.

Such a latex, if of natural rubber, or containing a substantial proportion of natural rubber, will as a matter of course contain ammonia. An ammonium soap of a fatty acid or rosin acid, such for example as ammonium laurate, myristate, stearate, or palmitate, or especially ammonium oleate, or rosinate, is added in concentration such that, in the presence of the zinc and the non-ionic surfactant, rapid gelation occurs at temperatures of, for example, 150–210° F. In addition, the concentration of the ammonium salt should be such that the viscosity of the latex compound is stable at storage temperatures up to 105° F. or 110° F., and against mechanically induced gelation. Although the optimum concentration of added soap will vary with the types and concentrations of the other components of the compound it will usually be between 0.3 and 3 phr., and is readily determinable for each case by simple tests. (phr. denotes parts per hundred parts of rubber or other elastomer).

Preferably the zinc is added to the latex as zinc oxide, in amount between about 0.5 and 3 phr.; if a zinc-ammonium salt is added instead of zinc oxide, corresponding molar quantities can be used. The function of the zinc is believed to be accelerate gelling of the latex compound after it has been applied, as will be described more fully below. If too little zinc is present, the advantage of quick drying is not obtained; if, on the other hand, too much is used, the storage stability of the latex compound is decreased, so that the process becomes technically impracticable. As already indicated, since the zinc oxide added is believed to react with the ammonium soap, the amounts of these two compounds will be correlated to give the particular combination of properties required.

Various non-ionic surfactants may be used, condensation products of alkylene oxides with long chain saturated or unsaturated fatty alcohols, acids, or amines being particularly useful. Thus, condensation products of oleyl alcohol with about 10–25 molecular proportions of ethylene oxide, some of which are commercially available products, may be used with advantage. The amount and type of non-ionic stabilizer will affect the temperature of gelatin, the type of gel formed and the maximum storage temperature of the latex compound possible without viscosity change. It will also affect the resistance of the compound to mechanical agitation. The amount used will usually be between 1.0 and 3 phr.

Although in the past it has been usual to incorporate a thickening agent in latex compounds to be used in forming sealing layers, it has been found that, in the process of the present invention, it is much more satisfactory to employ a mixture of fillers, one of which is preferably a slightly swelling clay such as china clay, while the other is non-swelling, preferably barytes, though it may, for example, be whiting (calcium carbonate). The use of such fillers in place of the usual thickeners not only has a substantial effect in reducing the time needed for the gelation, but also reduces the risk of variations in the properties, especially the viscosity, of the latex compound before use, and makes it generally easier to prepare. The total amount of filler used may be about 100 to 400 phr., depending on the concentration and viscosity of the latex, and the clay will generally be the minor component. For example, the ratio by weight of clay to barytes (or other non-swelling filler) may be between about 1:3 and 1:1.25, proportions between 1:3 and 2:3, and especially 1:2 being generally very satisfactory.

As the softening agent, paraffin wax is preferred, e.g. a paraffin wax of melting range about 100° F. to 200° F. The amount employed will depend largely on the degree of softness which the sealing layer or gasket is required to have, but will generally be between 10 and 45, especially 15 to 20, phr.

Most of the available anti-oxidants are of the amine or the phenol type, and for the present purpose the latter are preferred when solid, i.e. non-porous, layers or gaskets are required. Examples are 2,6-di-t-butyl-4-methylphenol, 2,2-methylene-bis(4-methyl-6-t-butylphenol), polytrimethyl-dihydroquinoline, and hydroxyquinone monobenzyl ether. If in any instance it is desired to use an amine anti-oxidant, suitable examples are N,N-di-$\beta$-naphthyl-p-phenylene diamine and dinoyl-p-phenylene diamine. Conventional proportions may be used. The paraffin wax used as softening agent may in some cases act also as an anti-oxidant to some extent.

As a vulcanizing system it is generally preferred to use sulphur and an accelerator, or a compound which acts as a source of sulphur with or without a separate accelerator. However, peroxides can be used if desired, as in the case of synthetic elastomers which contain little or no ethylenic unsaturation. Suitable accelerators for use with sulphur are well known, and include zinc diethyl dithiocarbamate, which is preferred, other zinc dialkyl dithiocarbamates, tetramethylthiuram monosulphide, and others employed in the examples. Only a small proportion of vulcanizing agent is required, since the layer or gasket is not required to be hard and rigid; thus, about 0.2 to 0.4 phr. of sulphur will usually be suitable, with the proportion of accelerator conventionally corresponding to this proportion of sulphur. If a carboxylated latex compound is used, zinc oxide will itself serve as a vulcanizing agent.

The latex may also contain other additives, such, for example, as pigments or other coloring matters. A porous layer may be obtained by incorporating a conventional blowing agent or microballoons, but this is generally less desirable than in a solid layer, except for certain applications such as in providing sealing gaskets for drums. Such gaskets can be formed either on the closure or on the rim of the drum itself. The various ingredients may be incorporated in the latex compound by any convenient procedure. For example, the vulcanizing ingredients, zinc oxide, color and anti-oxidant may be dispersed on a ball mill and added to the main bulk of the compound which is prepared by simple mixing and vacuumization.

The latex compounds described above can be stored for a period of months even at temperatures as high as 110° F., and are stable to agitation and shaking such as occurs during transport, or on stirring to homogenize them, but which nevertheless gel very quickly under the influence of heat after being applied to the closure base. They may be so applied in any conventional or convenient way, usually by extrusion. Thus, they may be extruded through a single nozzle onto a closure base while the latter is rotated so that a ring of latex compound is produced. The closure will then usually be fed directly through an oven in which it is heated to cause gelation and drying of the latex compound. The temperature employed will vary with the precise composition of the latex compound and the material of which the closure base is made; thus, metals may be heated more strongly than some plastics. In general, temperatures of about 150° F. to 200° F., are used, and at such temperatures the heating time needed will never exceed 30 minutes and will nearly always be only a few minutes, say 2 to 5 minutes. Indeed with porous layers even higher temperatures, e.g. up to 350° F. or 375° F., can be used, with correspondingly shorter heating times. Generally speaking, layer objects such as drum covers require the longer times, e.g. up to 30 minutes, the shorter times being quite adequate for small objects such for example as bottle closures and voltage regulator covers. All this represents a great advantage over the heating times of 2 to 3 hours needed in the past.

The new process has, moreover, the further advantage that drying can be effected within a few hours without heating at all, merely by allowing the closures to which the latex has been applied to stand in the air, for example, overnight, under conditions allowing the escape of water vapor. Thus, they can, for example, be stacked, e.g. on trays, in the atmosphere or in a current of air which may, if desired, be warmed. This method is of special advantage when the cover base is made of an organic plastic that would be damaged, or that might become distorted, at higher temperatures. It is also useful when it is desired to form a gasket round the rim of a drum.

The invention is illustrated by the following examples. "Parts" are by weight.

Example 1

The following were ball milled dry, in the usual way, and the resulting mixture was subjected to vacuum to free it from air.

A

| | Parts |
|---|---|
| Natural rubber latex, 60% | 167 |
| Ammonium oleate solution, 16.7% | 6 |
| Paraffin wax (melting range 40° C. to 70° C.) emulsion, 60% | 34 |
| Polybutadiene/acrylonitrile rubber latex, 33% | 15 |
| Surfactant solution (condensation product of oleyl alcohol with 20–25 molar proportions of ethylene oxide) 20% | 10 |
| China clay | 100 |
| Barytes | 200 |

The following were ball milled for 36 hours and added to the mixture A.

B

| | Part |
|---|---|
| Zinc oxide | 1.0 |
| Sulphur | 0.25 |
| Zinc dimethyl dithiocarbamate | 0.38 |
| Phenolic anti-oxidant | 1.0 |
| Red iron oxide (pigment) | 2.0 |
| Dispersing agent | 0.2 |
| Bactericide | 0.2 |
| Water | 4.0 |

The resulting latex compound did not thicken when stored at about 70° F. for several months, and was mechanically stable. Even after a week at 110° F. no thickening could be observed.

The latex was extruded to form a ring round the under surface of a metal closure base, the wet thickness of the ring being about 0.1 inch. The closure was passed through an oven in which it was heated to about 190° F. for 2 minutes, and was allowed to stand overnight to complete drying. In the resulting closure, the rubber ring adhered firmly to the metal, and was just sufficiently soft to retain a slight depression after being pressed onto the rim of a jar and then removed.

Example 2

The same latex compound as in Example 1 was applied in the same way to the closure base, which was then allowed to stand in the air for 24 hours, by which time drying was complete. The product had the same good properties.

Examples 3–8

The general procedure of Example 1 was repeated using compositions A and B as shown in the table.

In Examples 7 and 8 it was slightly modified by omitting the removal of air by subjecting Composition A to vacuum, and after mixing in Composition B the whole was mechanically foamed to a specific gravity of 0.8 to 0.9. Foamed products are obtained.

COMPOSITION A

| | Examples | | | | | |
|---|---|---|---|---|---|---|
| | 3 | 4 | 5 | 6 | 7 | 8 |
| 60% Natural rubber latex | 167 | 167 | 167 | 167 | 167 | 84 |
| 16.7% Ammonium oleate solution | 6 | 6 | | | 6 | |
| 20% Ammonium rosinate solution | | | 10 | 10 | | 4 |
| 60% Paraffin wax emulsion | 34 | 15 | 10 | 10 | 18 | 15 |
| 33% Polybutadiene/acrylonitrile latex | 30 | 30 | | | | |
| Carboxylated styrene/butadiene copolymer latex | | | 20 | | | |
| Polybutadiene/methacrylate latex | | | | 30 | | |
| 62% Styrene/butadiene copolymer latex | | | | | | 84 |
| 20% "Genapol O/200" [1] | 10 | 10 | | | 7.5 | 7.5 |
| 20% "Vulcastab LW" [2] | | | 7.5 | 7.5 | | |
| China clay | 120 | 120 | 60 | 80 | 70 | |
| Barytes | 240 | 80 | 140 | 140 | | |
| Whiting | | | | | 90 | 100 |
| Urea-formaldehyde resin microballoons | | | | | | 5 |

COMPOSITION B

| | | | | | | |
|---|---|---|---|---|---|---|
| Zinc oxide | 1.0 | 0.75 | 1.0 | 1.0 | 1.0 | 1.0 |
| Sulphur | 0.25 | | 0.25 | 0.4 | 1.5 | 1.0 |
| Zinc diethyldithiocarbamate | 0.38 | | | 0.52 | 2.0 | |
| Di-pentamethylenethiuram tetra sulphide | | 1.3 | | | | |
| Zinc dibutyldithiocarbamate | | 2.6 | 0.50 | | | 1.5 |
| "Nonox WSP" [3] | 1.0 | 1.0 | 1.0 | 1.0 | | |
| "Agerite White" [4] | | | | | 1.0 | |
| Di-nonyl-p-phenylene diamine | | | | | | 1.0 |
| "Dispersol LN" [5] | 0.2 | 0.5 | 0.2 | 0.3 | 0.2 | 0.2 |
| Sodium pentachlorophenate | 0.2 | 0.2 | 0.2 | 0.2 | 0.2 | 0.2 |
| Water | 4.0 | 8.0 | 4.0 | 6.0 | 3.7 | 5.5 |

[1] Condensation product of oleyl alcohol with 20-25 molar proportions of ethylene oxide.
[2] Believed to be a condensation product of cetyl and oleyl alcohols with 17 molar proportions of ethylene oxide.
[3] 2,2'-dihydroxy-3,3-di(α-methylcyclohexyl)-5,5'dimethyl-diphenylmethane.
[4] N,N'-di-β-naphthyl-p-phenylene diamine.
[5] Di-sodium naphthalene disulphonate.

Closures obtained as described in the examples can be applied to containers in conventional ways involving sterilization by heat or under other normal packing conditions.

We claim:
1. A composition for forming sealing gaskets which comprises a water-dispersed gasket-forming composition of
    (a) a rubber selected from the group consisting of (1) natural rubber, (2) synthetic unsaturated rubber, and (3) mixtures of (1) and (2),
    (b) 1 to 3 parts by weight of non-ionic surfactant which is a condensation product of an alkylene oxide with a member selected from the group consisting of a long chain fatty alcohol, acid and amine,
    (c) 0.3 to 3 parts by weight of an ammonium soap,
    (d) 0.5 to 3 parts by weight of zinc oxide,
    (e) 100 to 400 parts by weight of a filler,
    (f) 10 to 45 parts by weight of paraffin wax, and
    (g) an amount of an agent sufficient to vulcanize the rubber, the proportions of components (b) to (f) inclusive being based on 100 parts by weight of rubber.
2. A composition according to claim 1 wherein the ammonium soap is a member selected from the group consisting of ammonium laurate, ammonium myristate, ammonium stearate, ammonium, palmitate, ammonium oleate and ammonium rosinate.
3. A composition according to claim 2 wherein the ammonuim soap is ammonium oleate.
4. A composition according to claim 2 wherein the ammonium soap is ammonium rosinate.
5. A composition according to claim 1 wherein the non-ionic surfactant is the condensation product of oleyl alcohol and 10 to 25 molecular proportions of ethylene oxide.
6. A composition according to claim 1 wherein the rubber is natural rubber.
7. A composition according to claim 1 wherein the rubber is a mixture of natural rubber and a synthetic unsaturated rubber.
8. A composition according to claim 7 wherein the synthetic rubber is a copolymer of butadiene and acrylonitrile.
9. A composition according to claim 7 wherein the synthetic rubber is a copolymer of styrene and butadiene.
10. A composition for forming sealing gaskets which comprises 167 parts of a 60% natural rubber latex, 15 parts of a 33% polybutadiene/acrylonitrile rubber latex, 6 parts of a 16.7% ammonium oleate solution, 10 parts of a 20% solution of a condensation product of oleyl alcohol and 20 to 25 molar proportions of ethylene oxide, 1.0 part of zinc oxide, 34 parts of a 60% emulsion of paraffin wax, 100 parts of china clay, and 200 parts of barytes, all parts being expressed on a weight basis.

References Cited
UNITED STATES PATENTS

| 1,924,170 | 8/1933 | Szegvari | 260—743 |
| 2,933,467 | 4/1960 | Borunsky | 260—23.7 |

ALLAN LIEBERMAN, *Primary Examiner.*